(No Model.)
E. S. RENWICK.
ART OF MANUFACTURING STARCH, &c.
No. 272,324. Patented Feb. 13, 1883.
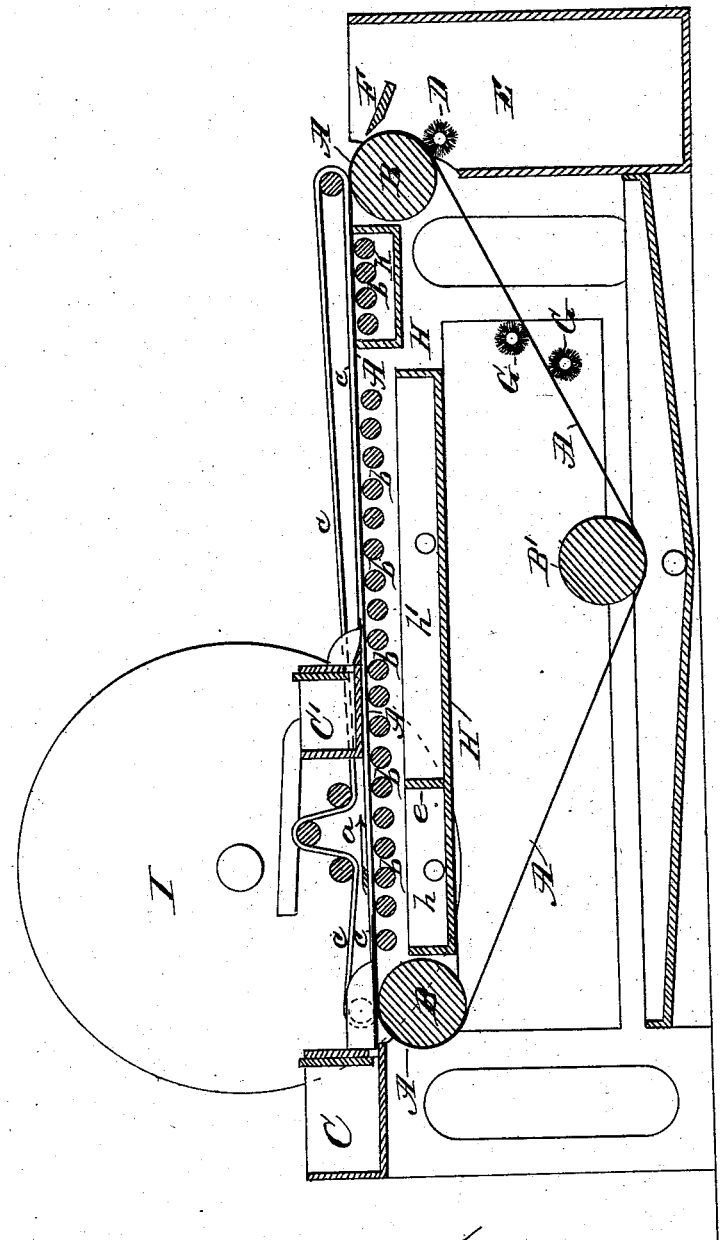
Witnesses.
James Warner
W. L. Bennem.
Inventor.
Edward Sabine Renwick

UNITED STATES PATENT OFFICE.

EDWARD S. RENWICK, OF MILLBURN, NEW JERSEY.

ART OF MANUFACTURING STARCH, &c.

SPECIFICATION forming part of Letters Patent No. 272,324, dated February 13, 1883.

Application filed August 17, 1882. (No model.)

*To all whom it may concern:*

Be it known that I, EDWARD SABINE RENWICK, of Millburn, in the county of Essex and State of New Jersey, have made an invention of certain new and useful Improvements in the Art of Utilizing Products of the Starch Manufacture, and of a new article of manufacture produced thereby; and I do hereby declare that the following, in connection with the accompanying drawing, is a full, clear, and exact description and specification of the same.

In the manufacture of starch as usually practiced a considerable loss of the material of the grain is experienced from the material carried as waste from the starch-depositories (whether vats or planes) by the watery liquor from which starch has been deposited. This last material comprises a large quantity of nitrogenous matter, which is valuable for feed. Previous to my invention the attempt has been made to save more or less of this waste matter by subjecting the spent starch-liquor from the starch-depositories to a separating operation by means of sieves (either revolving or vibrating) clothed with fine bolting-cloth; but, so far as I have been able to ascertain, this separating operation has proved a practical failure, because of the slimy character of the material, which speedily clogs the meshes of the bolting-cloth and renders the separators temporarily inoperative.

The object of the present invention is to save the said fine or slimy waste material, and to put it in a condition in which it constitutes a valuable feed for animals; and the invention is based upon the discovery that the waste material may be recovered in whole or in part from the spent starch-liquor in which it is contained by entangling the fine slimy or light matter by the coarse husky matter of the grain itself, and thereby incorporate the two in a single product.

In order that my invention may be fully understood, I have represented in the accompanying drawing the special apparatus which I deem best adapted for practicing my improvements in the art, and I will proceed to describe my process as practiced in part by the same, and also the new product which constitutes a part of my invention.

The grain from which the starch is to be made—Indian corn, for example—is steeped and is ground with water in the usual manner practiced in corn-starch factories. The ground watery mass is then subjected to separators of the usual construction, (either vibratory or revolving,) by means of which the starch-milk is separated from the coarser portions of the grain, which consist mainly of the skins or husks.

As the above operations and the mechanism for performing them are well known in the art of manufacturing starch, a detailed description of them is unnecessary.

The coarse matter of the grain, separated as above described, is by preference drained of the greater part of the water with which it is mixed, and it (or a part of it) is used, as hereinafter set forth, to entangle the fine or slimy matter of the grain. The starch-milk obtained in the separators is conducted (either with or without a preliminary condensation) to depositories, which may be either starch planes or vats of the usual construction, on or in which the starch is deposited, while the spent liquor is permitted to run off. The spent starch-liquor from the condensing-vats (if they be used) and from the starch-depositories contains the fine or slimy waste matter which is to be recovered by my invention, and the further operation upon it may be performed in part by the use of one or other of the machines hereinafter mentioned.

According to one mode of practicing this part or step of my invention, the spent starch-liquor is conducted into a vat, wherein it is mixed with the coarse, husky matter of the grain, obtained in the first separation, and the mixture is conducted to the draining-machine represented in the accompanying drawing, which represents a vertical longitudinal section of the machine. The said draining-machine is similar to the well-known Fourdrinier paper-machines, and it contains an endless band or web, A, of fine wire-cloth, which is supported or carried and is caused to move or travel in the direction of the arrow *a* by two large rollers, B B, and has its upper member supported between the said large rollers by a number of small carrying-rollers, *b*. A tension-roller, B', is applied to the lower member of the wire-cloth web to hold the same taut upon the carrying-rolls, and, if deemed best, a rubber pressing-roller may be used in connection with one of the larger carrying-rollers (at the opposite side of the wire cloth web) to secure the movement of the web by the said carrying-roll. The breadth of the wire-cloth web depends upon the quantity of material to be treated in a given time, a good breadth for practical use being forty-eight inches, and I prefer that the fineness of the cloth should be about sixty (60) meshes to the lineal inch.

At one end of the wire-cloth web is the feed-trough C, into which the mixture of starch-liquor and husky matter is introduced from the vat, either directly by gravitation or by means of a pump, the liquor being kept in agitation in the vat, as is customary with paper stuff. The mixture of starch-liquor and coarse matter is permitted to flow from the said feed-trough C in a broad, thin stream over a leather apron connecting the said trough with the wire-cloth web. The dimensions of the stream may, if desired, be controlled by a movable gate, as is customary with paper-machines. The escape of the liquor at the edges of the wire-cloth web is prevented by deckels c, of the usual construction, one arranged at each margin of the web. As the mixture is carried forward by the traveling movement of the web the water drains from the solid matter, leaving it in a layer upon the web; and as the slimy matter and husky matter are mixed together the former is entangled in the latter and the latter impedes or prevents the passage of the former through the meshes with the water. The drainage of the water from the solid matter is by preference furthered by imparting a shaking movement to the wire cloth, as is customary with paper-machines; but as the mechanism for imparting such movement is well understood it is not deemed necessary to describe it.

At the end of the wire-cloth web farthest from the trough I arrange a discharger, D, which preferably consists of a cylindrical brush caused to revolve preferably in the opposite direction to the traveling movement of the wire cloth, so as to discharge the solid material from it into a receptacle, E, from which it may be removed in any desired manner. Above the said brush-discharger I prefer to arrange a scraper, F, having its edge set close to the surface of the wire-cloth, so as to remove the greater part of the deposited material and reduce the work to be done by the brush-discharger.

In order that the traveling web be thoroughly cleansed before receiving the mixture, I prefer to arrange one or more revolving cleansing-brushes, G, to operate upon the web, and their work may be facilitated by jets of water introduced between the upper and under members of the web by means of a perforated pipe or a trough extended crosswise of the length of the apron. The water which passes through the wire-cloth is collected in a trough, H, arranged between the two members of the web, and may be allowed to run to waste; but as the water which escapes nearest the feed-trough contains some valuable matter I prefer to keep it separate from the residue by dividing the trough into two sections, h h', by means of a partition, e. The water which collects in the trough-section h' may be permitted to run to waste. That which collects in the trough-section h is raised by means of a pump or by a revolving scoop-wheel, I, at one side of the machine, and is delivered into a second feed-trough, C', from which it is permitted to flow in a gentle current over the solid material already collected upon the cloth apron. This collected material acts as a filter-bed, in which the fine matter remaining in the water is entangled, so that said matter is prevented from escaping with the water and becomes incorporated with the mass delivered at the delivery end of the machine.

The entanglement of the fine matter in the coarse, husky matter of the grain, and the separation or draining of the water from the compound of the two after their mixture, as above described, constitutes the last operation of this part of my invention.

The mass of matter or compound drained from water, substantially as above described, may be used directly as cattle-feed, for which it is highly valuable, because of the nitrogenous matter which it contains; or the said compounded matter may be pressed and dried before being sold or fed, the pressing being effected in bags or by means of a reciprocating plunger-press, or by a revolving screw press, such as is used on a small scale for expressing the juice from fruit, and the drying being effected by means of heat and agitation in a revolving cylinder such as is used for drying wet grain. In place, however, of simply drying the said compounded matter, I prefer to torrefy or bake it. For this purpose the matter, either immediately from the draining-machine or preferably after being pressed, is subjected to sufficient heat to bake it. I prefer to conduct this operation by charging the damp compounded matter into pans such as are used for baking bread, and to pass the said pans through an oven such as has been in common use for baking biscuit, the pans being placed upon an endless apron or web of coarse wire-cloth, which is caused to travel through the oven by means of carrying and supporting rollers. The furnace or furnaces for heating the oven are arranged at or near one end thereof, and the products of combustion are by preference conducted through the baking-chamber and escape through flues at the end farthest from the furnace. The speed of movement of the matter through the oven, and consequently the extent of the baking, can be regulated as is customary in the baking of biscuit in such ovens. Instead of baking the compound matter in pans, it may be molded, or may be kneaded and stamped by means of biscuit machinery, and may then be baked, as ordinary biscuits are baked, without pans.

The baked compound may subsequently be crushed by passing it between crushing-rollers such as are employed for crushing sugar.

The baked compound of the skinny or husky matter of the grain and of the fine or slimy matter recovered from the starch-liquor constitutes my new article of manufacture, which is peculiarly fitted for cattle-feed, both by reason of the nitrogenous matter which it contains and the cooking to which the compound has been subjected in the process of baking.

Although the draining-machine above described is in my opinion the best fitted for practicing my improvements in the art or processes, my said process or processes are not restricted to the construction thereof, as the drainage may be effected by other means. Thus the drainage may be effected by means of a hand-sieve of fine wire-cloth dipped into the mixture of husky matter and spent starch-liquor, and raised from the same, so as to let the contained water escape through the meshes, the collected matter being afterward discharged by turning the sieve upside down and jarring it; or a cylinder-drainer (having a sheet of wire-cloth or its equivalent of cylindrical form) may be substituted for the apron-drainer hereinbefore described. In such case the cylinder of the drainer is constructed and arranged in a feed-vat in all respects the same as the cylinder of a Dickinson paper-machine, such as is described in "Appleton's Dictionary of Mechanics," &c. Article: "Paper-Machines." The cloth-covered cylinder, however, is provided with a discharger such as has been previously described in this specification; or in place of using continuous draining-machines similar to paper-machines, and having traveling wire-cloths and discharges, as above described, the drainage may be effected by means of centrifugal machines similar to those used for draining sugar. When a machine with an endless band or web of wire-cloth is used, the drainage of the water may be furthered by the use of a vacuum-box, as is customary with Fourdrinier paper-machines, such vacuum-box being arranged, as indicated in the drawing at K, between the drain-water trough and the delivery end of the web, which must be made long enough for such purpose. As the construction and means of exhausting such vacuum-box are well understood, I do not deem it necessary to describe them in detail.

The invention is not restricted to the use of the whole of the coarse material of the grain to entangle the fine or slimy matter of the starch-liquor, as a part only of the former may be used for the purpose, and the residue may be used separately, or may be mixed with the compound of coarse and fine matter after the latter has been made as above described; or in place of employing the coarse husky or skinny material or matter of the same grain from which the starch is made coarse grain matter or material otherwise obtained may be used if found expedient. Thus the offal of wheat or parts of it may be used as the material for entangling and recovering the fine or slimy matter contained in the spent starch-liquor from Indian corn or maize.

The parts of my invention which relate to machinery are not restricted to their employment for practicing my said process, as they may be used for other purposes—as, for example, to the recovery of the slimy or fine material of spent starch-liquor by filtration through the coarse or husky matter of grain. In this case the coarse matter may first be charged upon the wire-cloth of the draining-machine described, and then the spent starch-liquor may be allowed to flow upon it, so that the said liquor is filtered by the coarse grain material, and the slime is deposited upon the said material on the draining-machine. In such case I prefer to conduct a mixture of the coarse matter with water into the first feed-trough of the machine, and to conduct the spent starch-liquor to the second feed-trough thereof, so that the spent starch-liquor is subjected to the filtering action of the layer of coarse grain previously drained of water, and said layer permits the water of the liquor to pass through it, but retains the fine or slimy matter, and the compound layer of the two is discharged at the delivery end of the machine, as previously described, the intermingling of the particles of the compound layer taking place to a greater or less extent as they leave the machine. When operating in this manner I sometimes hold the layer of the coarse grain matter to the wire-cloth by means of a second endless web of coarse wire-cloth, which is inverted above the first, and is caused to move simultaneously with the latter. Such second or upper web is shorter than the lower, so as to afford space for the receiving end of the lower apron for the formation of the layer of coarse material before the upper web presses it. The upper web is also narrower than the lower, so that the edges of the former are between the deckels. The second feed-trough in such cases is by preference arranged between the upper and under members of the upper or coarse wire-cloth web, and the spent liquor passes through the meshes thereof. A second discharging-brush is fitted to operate upon the upper apron, so as to discharge from it any matter which may adhere to it, and cleansing-brushes may be fitted to cleanse it. Said improvements in machinery may also be used for separating the coarse matter or material of grain from starch-milk, (in which case the separation may be furthered by the application of jets of water delivered upon the material on the traveling wire-cloth web or sheet,) or for separating the fine matter of spent starch-liquor directly from it without the use of the coarse of skinny matter of grain to entangle the said fine matter. In each of said cases the fineness of the cloth must be suited to the purpose to be accomplished. A traveling web or sheet of bolting-cloth may be substituted for the traveling web of wire cloth in the said draining-machine; but I do not recommend such substitution.

Having thus described my invention, I declare that, being aware that the fine matter of spent starch-liquor has been separated to some extent from the liquid part thereof long previous to my invention by subjecting the liquor directly to separating-sieves of bolting-cloth, I do not intend to claim that process. On the other hand, I do not claim in this patent the recovery of the fine or slimy matter of spent starch-liquor by filtering the latter through the coarse matter of grain, as described in a previous patent issued to me the 5th day of September, A. D. 1882, No. 263,958, the distinction between the two inventions in the art being that, according to said previous patent, the water is practically separated from the slime or fine material of the spent starch-liquor before the mixture of the slime with the coarse grain material, said slime being first deposited on top of the coarse material through which the water of the liquor passes, and the intimate mixture of the slime and coarse grain material being effected subsequently, whereas according to the present invention in the art the coarse material is first mixed with the spent starch-liquor before the separation of the water, (which operates as a vehicle to facilitate the intermingling of the particles,) and the water is drained from the semi-fluid mass after the mixture is effected.

I claim as my present invention—

1. The process, substantially as before set forth, of recovering the fine or slimy matter of spent starch-liquor, consisting of the mixture of coarse grain material with said liquor and the subsequent drainage of the water from the compound thereby formed.

2. The improvement in the art of manufacturing starch, consisting, substantially as before set forth, of the separation of the starch-milk from the husky matter of grain, the separation of the starch from the starch-milk by deposition, the mixture of the coarse, husky matter of grain with the spent starch-liquor, and the subsequent drainage of the water from the mixture.

3. The process, substantially as before set forth, consisting of the separation of the husky matter of grain from the starch-milk, the separation of the starch from the starch-milk by deposition, the recovery of the fine or slimy matter from the spent starch-milk, the compounding of the same with coarse grain material, and the baking of the compound thereby obtained.

4. The combination, substantially as before set forth, of the traveling web of wire-cloth, the deckels at the margins of said web, the feed-trough for delivering the liquid mixture thereto, and the discharger for discharging the drained material therefrom.

5. The combination, substantially as before set forth, of the traveling web of wire-cloth, the feed-trough for delivering the liquid mixture thereto, and the cleansing brush.

6. The combination, substantially as before set forth, of the traveling web of wire-cloth, the first feed-trough for delivering a liquid mixture thereto, and the second feed-trough to deliver matter upon the layer of material previously collected on said wire-cloth.

7. The new article of manufacture, consisting, substantially as before set forth, of coarse grain material compounded with the fine or slimy matter of spent starch-liquor and baked.

In witness whereof I have hereto set my hand this 8th day of August, A. D. 1882.

EDWARD SABINE RENWICK.

Witnesses:
  G. M. BARRETTS,
  W. L. BENNEM.